H. C. SOULE.
SYSTEM OF ELECTRIC MOTOR CONTROL.
APPLICATION FILED JAN. 10, 1908.

934,470.

Patented Sept. 21, 1909.

WITNESSES:
Fred H. Miller
R. J. Dearborn

INVENTOR
Herbert C. Soule
BY
Wesley G. Carr
ATTORNEY

UNITED STATES PATENT OFFICE.

HERBERT C. SOULE, OF WILKINSBURG, PENNSYLVANIA, ASSIGNOR, BY MESNE ASSIGN-MENTS, TO WESTINGHOUSE ELECTRIC & MANUFACTURING COMPANY, OF EAST PITTSBURG, PENNSYLVANIA, A CORPORATION OF PENNSYLVANIA.

SYSTEM OF ELECTRIC-MOTOR CONTROL.

934,470.  Specification of Letters Patent.   Patented Sept. 21, 1909.

Application filed January 10, 1908. Serial No. 410,215.

*To all whom it may concern:*

Be it known that I, HERBERT C. SOULE, a citizen of the United States, and a resident of Wilkinsburg, in the county of Allegheny and State of Pennsylvania, have invented a new and useful Improvement in Systems of Electric-Motor Control, of which the following is a specification.

My invention relates to systems of electric motor control, and it has special reference to such voltage-regulating means as may be utilized for governing the speed and operation of alternating current railway motors.

When alternating current motors are employed for the propulsion of railway vehicles, and for similar purposes, transformers or other voltage-regulating means are employed for adapting the voltage of the supply circuit to the motors during the starting and operating periods. Auto-transformers have often been used for this purpose, and, when a number of motors of relatively large size are supplied from a single transformer, the low-voltage windings usually comprise a plurality of coils connected in multiple circuit. In the prior art, the low-voltage coils have been similarly constructed and provided with corresponding taps which were inter-connected by bars of conducting material or by other suitable means, the coils being then treated exactly as if they were a single coil, as in the system illustrated and described in Patent No. 834,525, granted October 30, 1906, to the Westinghouse Electric & Manufacturing Company, as assignee of Ray P. Jackson. When a large number of steps are desired, the number of taps required in the aforesaid arrangement is so great that considerable difficulty is experienced in their disposition and insulation.

According to my present invention, I provide a plurality of taps in each coil which do not correspond to each other but which, together, constitute a series of variable-voltage steps. In this way, I obtain a close regulation without involving the usual inter-connections between the coils and I provide, in addition to the usual system, means for preventing any material unbalancing in the currents traversing the several coils.

Figure 1:
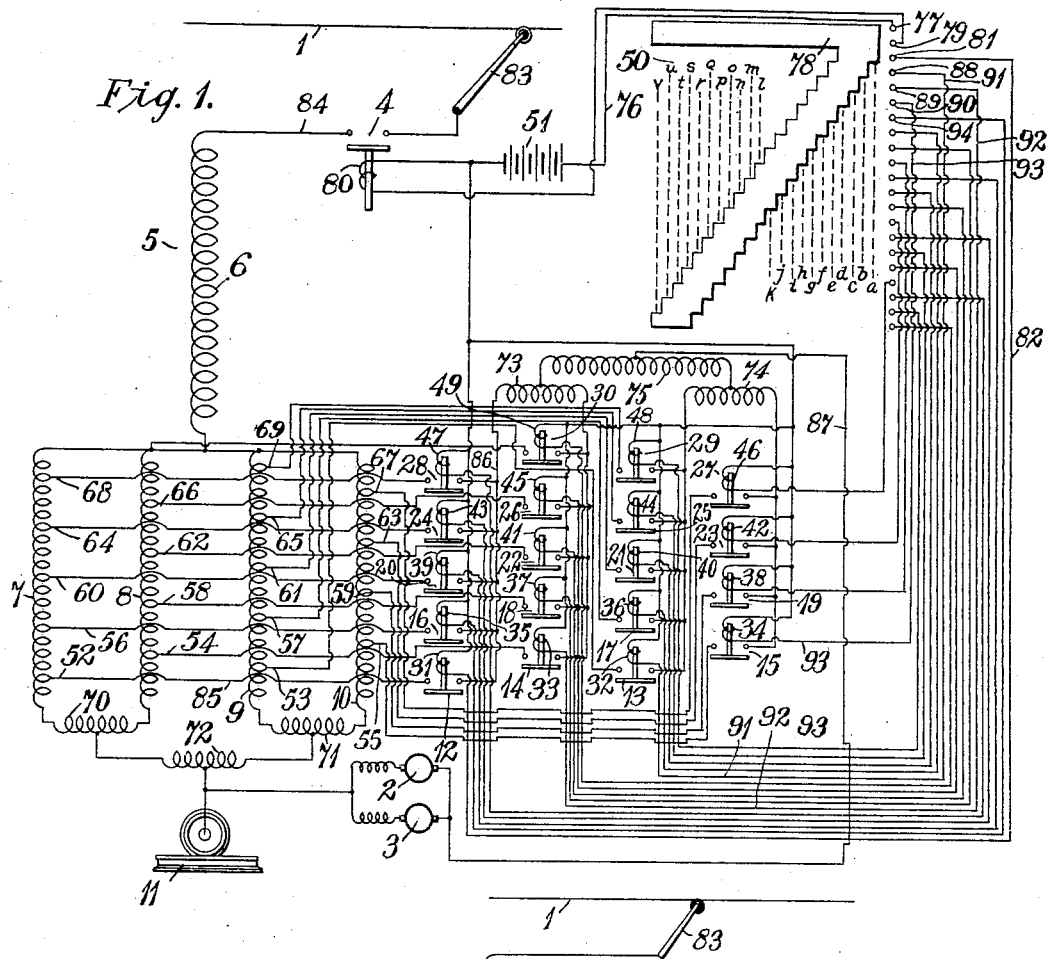
Figure 2:
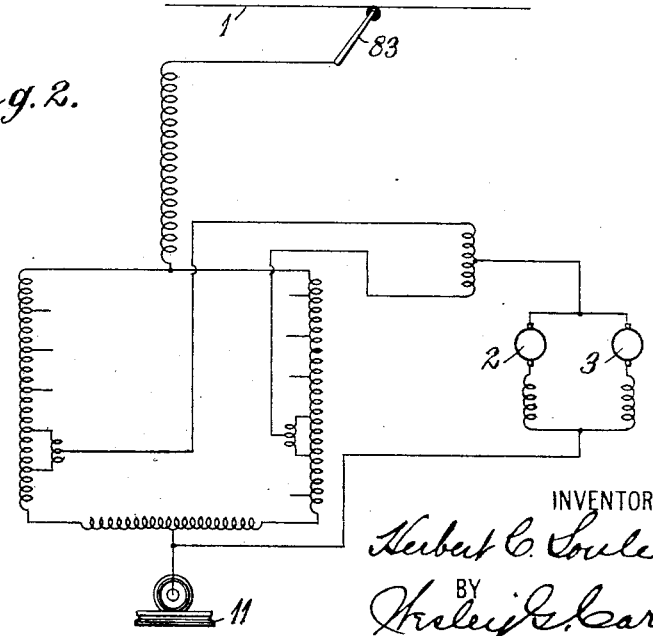

Figure 1 of the accompanying drawings is a diagrammatic view of a system arranged in accordance with my invention, and Fig. 2 is a view, similar to Fig. 1, of a slightly modified arrangement of main circuit connections, with the control circuits omitted.

Referring to the drawings, alternating current energy is supplied from an overhead conductor 1 to motors 2 and 3 through a line switch 4 and a voltage-regulating transformer 5. The transformer 5 comprises a primary coil 6 and a plurality of secondary coils 7, 8, 9, and 10 which are connected in multiple circuit and are interposed between the primary winding 6 and a rail or return circuit conductor 11.

The voltage applied to the motors 2 and 3, which are connected in multiple circuit with each other, is determined by control switches 12 to 30, inclusive, having operating magnet windings 31 to 49, inclusive. The control switches are governed by a master controller 50 which is adapted to occupy positions $a$ to $v$, inclusive. The control switches of the system are energized from a storage battery 51 which may be replaced by any other suitable source of energy.

The secondary coils 7, 8, 9, and 10 of the transformer 5 are provided with the following voltage taps, named in order of their several electromotive forces from lowest to highest: 52, 53, 54, 55, 56, 57, 58, 59, 60, 61, 62, 63, 64, 65, 66, 67, 68, and 69. Preventive coils 70 and 71 are interposed between the low-voltage extremities of the coils 7 and 8, and 9 and 10, and the middle points of these preventive coils are connected together by a third preventive coil 72, the middle point of the latter being connected to the return circuit conductor 11. Another group of preventive coils 73, 74, and 75 is interposed between the transformer taps and the motor circuit in accordance with the Jackson patent to which reference has hereinbefore been made.

The operation of the system of Fig. 1, and the circuit connections for it, are as follows: If the master controller 50 is moved from its "off" position to position $a$, a control circuit is established from one terminal of the battery 51 through conductor 76, contact finger 77, contact ring segment 78 and contact finger 79 to the operating magnet winding 80 of the line switch 4, a branch circuit being also established from the contact member 78 through contact finger 81 and conductor 82 to magnet winding 31 of the switch 12.

One terminal of each operating magnet winding, in the system, as illustrated, is connected to one terminal of the battery, and as soon as windings 80 are 31 are energized the switches 4 and 12 are closed. A main circuit is now completed from the line conductor 1 through a trolley 83, switch 4 and conductor 84 to one terminal of the transformer 6. A motor circuit is completed from tap 52 in transformer winding 7, through conductor 85, switch 12, conductor 86, a portion of preventive coils 73 and 75 and conductor 87 to one terminal of the motors 2 and 3. In this way, a relatively low-voltage current will be supplied to the motors. If the master controller 50 is now moved to successively occupy positions $b$, $c$, and $d$, contact fingers 88, 89, and 90 are successively moved into engagement with the contact segment 78, circuits being successively established through conductors 91, 92, and 93 to magnet windings 32, 33, and 34 of the switches 13, 14, and 15. When the switch 13 is closed, transformer tap 53 of the coil 9 is connected to one terminal of the preventive coil 74; when switch 14 is closed, transformer tap 54 is connected to one terminal of the preventive coil 73 and when switch 15 is closed, transformer tap 55 is connected to the free terminal of preventive coil 74. Thus, it will be observed that preventive coil 73 is connected between transformer taps 52 and 54 and preventive coil 74 is connected between taps 53 and 55. By this means, the voltage impressed on the motor is gradually increased without interrupting the motor circuit and, at the same time, no part of the transformer windings is short-circuited.

If the master controller is moved from position $d$ to position $e$, contact finger 81 is disengaged from the contact member 78 and a contact finger 94 moves into engagement with the ring segment. The arrangement of parts is such that the finger 81 becomes disengaged from the segment before the finger 94 moves into engagement therewith and, consequently, the closing of the switch 16, which is effected by the circuit established through the finger 94, is not accomplished until the switch 12 is opened. With the controller in position $e$, it will be observed that one terminal of the preventive coil 73 is transferred or stepped up from tap 52 to tap 56, with which it is now connected.

As the master controller moves to position $f$, preventive coil 74 is disconnected from tap 53 and is joined to tap 57. The next step of the controller moves one end of preventive coil 73 from contact with tap 54 into contact with tap 58, and the next step similarly disconnects preventive coil 74 from tap 55 and connects it to tap 59. As the controller is moved through its succeeding positions, the scheme of connections already commenced is similarly carried out and the voltage applied to the motors is gradually increased until, when position $v$ is occupied, switch 30 is closed and the motors are connected to the high-voltage extremities of the transformer secondaries.

Any slight unbalancing in the currents traversing the transformer coils 7, 8, 9, and 10, which would otherwise occur by reason of the dissimilarity in the voltage of the intermediate winding taps, is substantially prevented by the preventive coils 70, 71, and 72.

The system of Fig. 2 is similar to that of Fig. 1, except that two secondary coils are employed in lieu of the four shown in Fig. 1. The taps from the two secondary coils form a series of steps of gradually increasing voltage and the preventive coils are stepped up one at a time, the low-voltage tap always being interrupted before a connection is made to the fifth higher tap.

Although I have illustrated my improved system in connection with the control of two electric motors, its use is obviously not restricted in this regard, and the voltage-regulating means which I claim as my invention may be utilized for one or more vehicle motors and for various other purposes.

I claim as my invention:

1. In a system of voltage regulation, the combination with a transformer having two or more windings connected in multiple circuit, and non-corresponding independent taps in each winding which, together, constitute a series of substantially equal voltage steps, of means for interconnecting the taps to produce voltage steps not represented by any of the independent taps.

2. In a system of voltage regulation, the combination with a transformer having two or more similar windings connected in multiple circuit, and non-corresponding independent taps in each winding which, together, constitute a series of voltage steps, of three preventive coils, one of which is connected to the middle points of the other two, and means for varying the connections between the terminals of the two preventive coils and the transformer taps to obtain a plurality of voltage steps not represented by the transformer taps.

3. In a system of voltage regulation, the combination with a transformer having four windings connected in multiple circuit, and non-corresponding independent taps in each winding which, together, constitute a series of voltage steps, of means for interconnecting the taps to produce voltage steps not represented by any of the independent taps, preventive coils interposed between the low voltage extremities of the windings arranged in groups of two, and a preventive coil joining the middle points of the other two.

4. In a system of voltage regulation, the combination with a supply circuit, a transformer having a primary winding and four secondary windings connected in multiple circuit, the primary and secondary windings being connected in series with each other and across the supply circuit, and independent taps in each of the secondary windings which, together, constitute a series of voltage steps, of preventive coils which join the low voltage extremities of the secondary winding in groups of two, and a third preventive coil the extremities of which are connected to the middle points of the other two and the middle point of which is connected to the supply circuit, and means for interconnecting the taps to produce voltage steps not represented by an independent tap.

5. In a system of voltage regulation, the combination with a supply circuit, a transformer having a primary winding and four secondary windings connected in multiple circuit, the primary and secondary windings being connected in series with each other and across the supply circuit, and independent taps in each of the secondary windings which, together, constitute a series of voltage steps, of preventive coils which join the low voltage extremities of the secondary windings in groups of two, and a third preventive coil the extremities of which are connected to the middle points of the other two and the middle point of which is connected to the supply circuit, three other preventive coils, one of which is connected to the middle points of the other two, and means for varying the connections between the terminals of the two preventive coils and the transformer taps to obtain a plurality of voltage steps not represented by the transformer taps.

6. In a system of voltage regulation, the combination with a plurality of transformer windings and preventive resistances for connecting the windings together at one end, of a plurality of non-corresponding taps in the windings which together constitute a series of voltage steps, and preventive resistances for associating the taps to produce voltages not represented by any of the taps.

In testimony whereof, I have hereunto subscribed my name this 20th day of December, 1907.

HERBERT C. SOULE.

Witnesses:
 VERYL BROUGHTON,
 BIRNEY HINES.